Dec. 13, 1966  W. W. WOODS  3,292,059
FORCE TRANSDUCER
Filed July 9, 1964
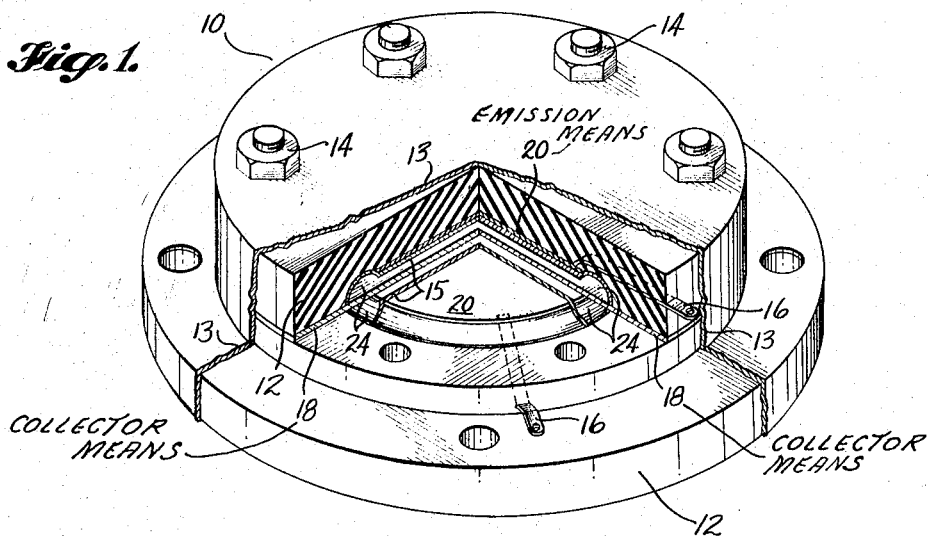
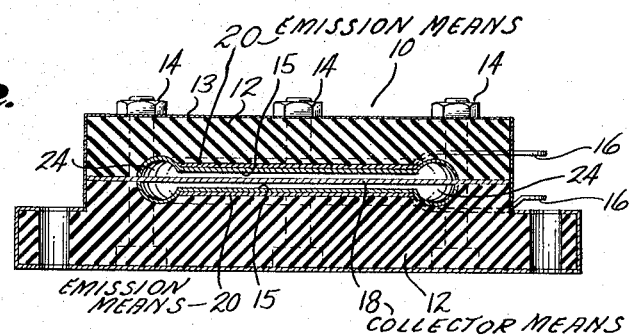
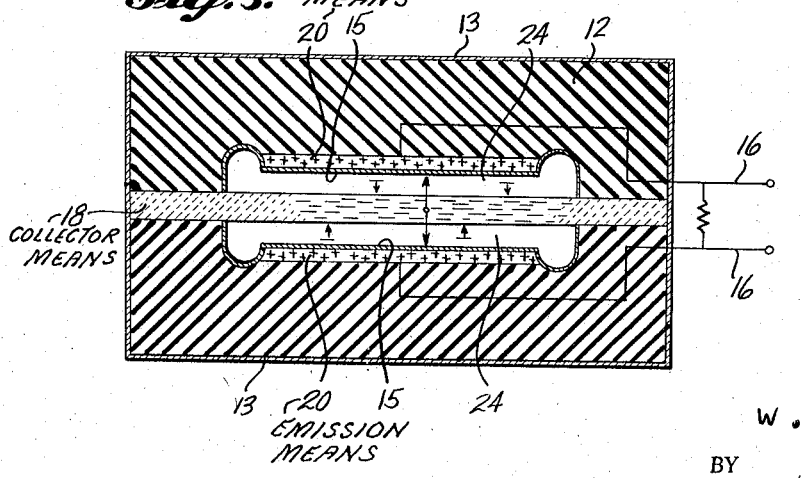
INVENTOR.
W. W. WOODS
BY K. W. Thomas
ATTORNEY

United States Patent Office 3,292,059
Patented Dec. 13, 1966

3,292,059
FORCE TRANSDUCER
Weightstill W. Woods, Redmond, Wash., assignor to The Boeing Company, Seattle, Wash., a corporation of Delaware
Filed July 9, 1964, Ser. No. 381,351
7 Claims. (Cl. 317—246)

This invention relates to mensuration means and more particularly to transducer apparatus for measuring accurately a change in force or pressure. The instant invention derives particular utility in measuring velocity change of a mass and change in force or pressure existing in a system disposed within a high temperature medium.

The high temperature environment created by re-entry vehicles precludes the use of conventional low-temperature mensuration means. Prior attempts to solve the problem of high temperature environment velocity change measurement have failed because of adherence to conventional low temperature materials and mensuration practices. In herent limitations, not only of strain gages but also of inductance-resistance potentiometer and piezoelectric pressure cells for measurement of force change, have resulted in proposals to employ capacitance-type transducers for this purpose. The use of piezoelecrtic materials for ferro-electric polarization is resctricted to relatively low temperatures by the Curie point temperatures of known materials. To obtain a self-generating capacitive transducer, one must provide other means of polarization.

Two basic advantages gleaned from the use of capacitance-type transducers are: (1) the mechanical construction of the unit can be made considerably less complex than that of other forms of force measuring cells, and (2) the electrical heat generated within this type of cell body is generally lower.

The use of capacitance-type transducers has proven that the particular construction provides relatively rugged and enduring resistance to use in high temperature and jarring media. One reason for this relatively rugged characteristics is that the capacitance-type transducer does not require any moving element for sensing force variation other than a diaphragm. However, in the past a number of difficulties have been experienced in securing reliable operation with such a transducer. Conventionally, such transducers are operated at the end of a cable providing leads to associated elecrtcial equipment. In the past most of such transducers have employed a transformer or amplifier in the same housing as the cell in order to overcome the effect of cable capacity and stability of the output signal. The use of these added associated parts undesirably increases over-all size of the transducer and places temperature sensitive components within the cell body.

Provision for zero drift in response to temperature changes is extremely important when high frequency force variations are to be measured. In such cases, the force responsive cell diaphragms are necessarily very stiff and are designed for pressure induced movements of as little as 0.00001 of an inch. It is obvious that any temperature change can result in diaphragm deflections of comparable magnitude rendering signal interpretation difficult or impossible. Briefly, therefore, the instant invention comprises mensuration means to determine change in force or pressure. The mensuration means includes means enclosing and defining a chamber. The chamber is formed in part by oppositely disposed electrically conducting surfaces, the surfaces being integral with the last mentioned means and having means for emitting charged particles. Disposed within the chamber between the electrically conducting surfaces is a charged particle collector means which is responsive to force and pressure. Circuit means interconnect the conducting surfaces and external evaluation means. As the collector means is caused to bias nearer to one of the conducting surfaces than the other, due to changes in pressure or forces, the capacitance of the mensuration means changes and an output signal is transmitted to the external evaluation means.

A feature of the present invention is a capacitance-type mensuration means having means providing over-all rugged construction and small size with high sensitivity. A second feature of the present invention is to provide a self-generating capacitance transducer having internal means of polarization. The particular means provide a temperature-independent, long-life voltage or current source, employed to provide the necessary polarization voltage. By utilizing components having low matched coefficients of expansion, motion within the cell due to temperature changes is negligible. Complete electrical shielding of the transducer, both internally and externally, eliminates not only the effect of outside electromagnetic disturbances but also the possibility that relative motion between the inner conductor and the cell housing will be introduced as a capacitance variation into the output signal.

As mentioned above, a feature of this invention is the provision of a temperature-independent, long-life voltage or current source. One such current source with essentially zero temperature coefficient over practical temperature ranges is the nuclear beta ray battery, in which the beta rays constitute the current flow. A practical source of current is Promethium 147, a fission product readily and inexpensively obtained in pure form, carrier free, with pure beta emission and having an essentially stable decay product (Samarian 147, half life $1.3 \times 10^{11}$ years). The life of the battery is inferred from the 2.6 year half life of Promethium 147, in that the output current decreases by a factor of two each 2.6 years. The radiation source characteristically emits high energy charged particles; viz., negatively charged beta particles, which are collected on a collecting means to establish a potential with respect to the source. The energy of the potential thus established is used to supply current to a low voltage circuit. The transducer cell is evacuated and filled with an inert gas so that substantially no ionizable gas molecules are present between the source and the collectors means. Use of inert gas rather than, e.g., air prevents ionization which would cause substantial if not complete discharge of the accumulated electrical charge; the inert gas medium provides a necessary environment within which to operate the collector means at constant charge level somewhat independent of deflection. The use of inert gas concomitantly provides critical damping for the collector means.

Accordingly, it is an object of the present invention to provide an improved, self-containing, self-generating transducer of the capacitance-type.

A further object of the invention is to provide a sensitive mensuration device of small size and rugged construction.

A third object of the invention is to provide a force sensitive mensuration means providing instantaneous evaluation of the changing velocity of a mass.

Still a further object of the teachings of this invention is to provide a force mensuration means having an independent long-life voltage or current source battery.

A still further object of the invention is to provide an improved voltage source in a mensuration device which does not require a solid dielectric member for preventing the flow of a reverse ion current.

Other objects and many of the attendant advantages of this invention will be readily appreciated as the same becomes better understood by reference to the following detailed description when considered in connection with the accompanying drawings wherein:

FIGS. 1 and 2 are top and cross-sectional views, respectively, of the mensuration means designed in accordance with the principles of the present invention;

FIG. 3 is a diagrammatic view showing in detail the particular components of the instant invention shown generally in FIG. 2.

Referring now to the embodiment of the invention illustrated in FIGS. 1 and 2, mensuration means 10, being a capacitor transducer cell, is shown which comprises means 12 defining and enclosing a chamber or gap 24. The means 12 comprise generally a casing made of a nonmetallic material, such as magnesium oxide, having an exterior electrical shield coating 13 and fasteners 14 such as bolts or rivets, which are fabricated from high nickel alloys such as Monel or M–252 and which have temperature coefficients of expansion matching that of the sensor components, within casing 12, to be defined below. The fasteners 14 join two symmetrical members to form casing 12. The members may also be cemented, or joined by other suitable fashion. The shield coating 13 of casing 12 may conveniently be applied by spraying. The symmetrical design of the transducer 10 provides maximum discrimination against the effects of transverse acceleration and thermal gradients.

Circuit means 16 are cemented within the casing 12 and are disposed to interconnect oppositely disposed electrically conducting surfaces 20 within the transducer 10 and an external evaluation system (not shown). Sensor components within transducer 10 comprise charged particle collector means 18, being a ceramic oxide (e.g., BeO or MgO) diaphragm or electrode 18 of high resistivity, resiliently mounted between the oppositely disposed electrically conducting surfaces 20. The surfaces 20 are essentially capacitor electrodes integrally part of casing 12, and have means for emitting charged particles, e.g., a surface coating of Promethium Oxide ($Pm_2O_3$), not shown, which characteristically emits beta particles (electrons). The electrons are absorbed on the diaphragm 18, charging it negatively with respect to surfaces 20. The potential appearing between the diaphragm 18 and the electrode 20 does not appear in the external circuit, as the output is taken across the electrode 20 which are essentially at the same potential except for force and/or pressure signals. It is important to consider that the source of electrons is not restricted to the use of Promethium Oxide. For example, another source of beta particles is Strontium 90. Other beta particle emitters, or alternatively, emitters of positively charged alpha particles may be used as well.

Stability of the diaphragm 18 electrical charge is maintained by the nonlinear effect of ion multiplication in the gap 24. For this purpose, an optimum density of argon or any other inert gas is maintained within the transducer 10, gap 24, functioning also to damp the diaphragm 18 to near critical damping.

The details of the radioactive battery means, disposed within the capacitor transducer 10, are illustrated in FIG. 3. The embodiment of FIG. 3 includes capacitor electrodes (surfaces) 20 having disposed therebetween a diaphragm 18. Circuit means, including electrode leads 16, conduct changing values of capacitance, due to deflection of diaphragm 18 relative to surfaces 20, to exterior evaluation systems (not shown). The inert gas medium in gap 24 is maintained at or near atmospheric pressure, and makes possible development of a high ionization potential. The force responsive diaphragm 18, formed of a ceramic oxide as discussed above, and having high resistivity, is disposed between the capacitor electrodes 20 so as to leave an inert gas gap 24 between the diaphragm 18 and the capacitor electrodes 20. The gap 24 allows for flexing of diaphragm 18 which, as will now be apparent, constitutes the movable electrode of the capacitor transducer 10. The oxide diaphragm 18 is ground to a thickness of approximately 0.013 inch, providing a natural frequency for diaphragm 18 of 6,000 cycles per second. At an acceleration level of 200 g's peak, as an example of one embodiment in which the instant invention will functionally serve, the maximum deflection of diaphragm 18 will be 0.0001 inch, producing only low stress levels in the diaphragm. Hysteresis problems in the device are thus largely avoided.

The relatively small, mechanical full-scale deflection afforded in the transducer 10 requires close spacing between electrode 18 and capacitor electrodes 20. The electrodes 20 have a thin film of platinum 15 evaporated onto the Promethium oxide surfaces. Leads 16 from electrodes 20 are brought out through seals in the casing 12 and transmit an output signal at relatively high impedance. Although the effective capacity of the transducer 10 is small (approximately 100 picofarads) the expected no-load full-scale output voltage (approximately 200 volts peak) is high enough to yield significant sensitivity values (20 millivolts per gravity) when shunted by cable and terminal capacity values as high as 0.01 microfarad.

To complete the electrical circuit for the capacitor-transducer 10, the casing 12 of the transducer 10 is grounded to concomitantly ground the edge of diaphragm 18. The output of the transducer 10 may also be measured by more or less conventional bridge circuits (not shown) which have a sensitivity adequate to detect capacitance changes as small as 1 x 10 to the minus 50th power farad. It is also desirable that these measuring circuits have full electrostatic shielding, such as is provided to transducer 10 by shield coating 13.

In operation, one of the features of the instant invention constructed in accordance with the teachings of the present invention is that temperature effects are minimized. This is due in large measure to: (1) the low coefficient of linear expansion of the material from which casing 12 is constructed; (2) the low coefficient of expansion of the material from which the insulating member or electrostatic shield 13 is formed; (3) the thinness of the metallic film which covers fixed capacitor electrodes 20; and, (4) the over-all reduced dimension of the cell 10 assembly itself.

A further feature of the instant invention is the self-containing battery current-generating components, comprising: (1) ceramic oxide diaphragm 18; and (2) Promethium oxide coated capacitor electrodes 20.

In operation, the instant invention provides mensurating means to accurately determine force and/or pressure. The force causes motion of the diaphragm 18 thereby varying the capacitor gap 24 between diaphragm 18 and capacitor electrodes 20. As the gap 24 varies, capacitance of the transducer 10 varies and a corresponding signal is transmitted by leads 16 to external evaluation systems (not shown). More specifically, motion of diaphragm 18 establishes charge motion between electrodes 20. This charge motion causes equivalent charge motion in the external circuit (not shown) which, because of electrical leads 16, will be largely capacitive. Assuming a diaphragm 18 charge of $10^{-7}$ coulombs, a displacement by 5% of the total gap spacing 24 will cause a charge-motion of approximately $5 \times 10^{-9}$ coulombs in the external circuit (not shown). Assuming further an external circuit capacitance of 0.01 microfarad, an an output voltage of 50 volts will be produced.

External circuit resistance (not shown) is determined largely by the low frequency response desired:

$$f_{min.} = \frac{1}{2\pi RC} \qquad 1$$

where $f_{min}$ is a low frequency half power point, R is the circuit shunt resistance (not shown), and C is the total circuit capacitance. Again, assuming a total circuit capacitance of 0.01 microfarad and a shunt resistance of one megohm, $f_{min}$ will be 15 c.p.s.

Since numerous changes may be made in the above apparatus and different embodiments may be made without departing from the spirit thereof, it is intended that all matter contained in the foregoing description or

I claim:
1. A capacitance transducer comprising:
   (a) a non-metallic means defining a chamber and having oppositely disposed capacitor electrodes, said capacitor electrodes having surfaces coated with charged particle emission means; and
   (b) a flexible electrode mounted between said capacitor electrodes, said flexible electrode providing charged particle collecting means and said flexible elctrode being disposed within an inert gas medium.

2. The transducer defined in claim 1 wherein said non-metallic means has an exterior temperature and electrical shield coating.

3. The transducer defined in claim 1 wherein said charged particle emission means includes a source of beta particles.

4. The transducer defined in claim 1 wherein said charged particle emission means includes a source of alpha particles.

5. The transducder defined in claim 1 wherein said flexible electrode comprises a ceramic oxide.

6. The transducer defined in claim 1 wherein said capacitor electrodes have a thin film of platinum evaporated onto said charged particle emission means.

7. Mensuration means comprising:
   (a) means defining and enclosing a chamber, said means having:
      (1) oppositely-disposed electrically conducting surfaces, said surfaces being integral with said last-mentioned means and having;
      (2) means for emitting charged particles; and
   (b) a flexible charge particle collector means disposed between said electrically conducting surfaces.

References Cited by the Examiner

UNITED STATES PATENTS

| | | | |
|---|---|---|---|
| 3,027,769 | 4/1962 | Coon | 317—246 |
| 3,113,464 | 12/1963 | Shulman | 73—517 |
| 3,120,130 | 2/1964 | Cohen | 73—517 |

LEWIS H. MYERS, *Primary Examiner.*

E. GOLDBERG *Examiner.*